2,788,343

CHROMIFEROUS AZO-DYESTUFFS

Arthur Buehler, Rheinfelden, Alfred Fasciati, Bottmingen, and Christian Zickendraht, Binningen, Switzerland, assignors to Ciba Limited, Basel, Switzerland, a Swiss firm No Drawing. Application December 15, 1952, Serial No. 326,141

Claims priority, application Switzerland December 15, 1951

5 Claims. (Cl. 260—147)

According to this invention valuable new chromiferous azo-dyestuffs are made by treating with an agent yielding chromium a monoazo-dyestuff which is free from sulfonic acid and carboxylic acid groups and corresponds to the general formula (1)
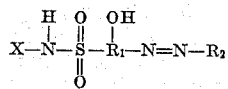

in which $R_1$ represents a benzene radical bound to the azo linkage in ortho-position to the hydroxyl group, $R_2$ represents the radical of a keto-methylene compound bound to the azo linkage in a position vicinal to the keto group, and X represents an aryl radical which contains a substituent of the formula

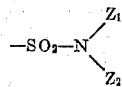

in which $Z_1$ and $Z_2$ each represent a hydrogen atom or alkyl or hydroxyalkyl radical containing at most 6 carbon atoms.

The monoazo-dyestuffs corresponding to the above formula, and used as starting materials in the present process, can be made by coupling a keto-methylene compound capable of coupling in a position vicinal to a keto group and free from sulfonic acid and carboxylic acid groups with an ortho-hydroxy-diazo-compound free from sulfonic acid and carboxylic acid groups and obtained by diazotizing an amine of the formula (2)
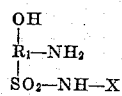

in which $R_1$ and X have the meanings given above.

The benzene radical of those 2-amino-1-hydroxybenzenes may be bound in the 4-, 5- or 6-position to the —SO₂—NH—X group, and it may contain further substituents incapable of salt formation, for example, a halogen atom or a nitro group. The aryl radical X may be, for example, a naphthalene or advantageously a benzene radical, which contains a sulfonic acid amide group, advantageously one of the formula —SO₂—NH₂ and, if desired, further substituents such as an alkyl group (for example, methyl), a chlorine atom or the like.

Compounds of the Formula 2 can be prepared, for example, by reacting an amine of the formula X—NH₂, in which X has the meaning given above, with 1-chloro-2-nitrobenzene-4-sulfonic acid chloride, reacting the resulting 1-chloro-2-nitro-benzene-4-sulfonic acid amide with an alkali or alkaline earth metal hydroxide to form the corresponding 1-hydroxy-compound, and converting the nitro-group in the latter compound in known manner into an amino group. Instead of using 1-chloro-2-nitro-benzene-4-sulfonic acid chloride as starting material there may be used, for example, 1:2-benzoxazolone-5-sulfonic acid chloride, in which case, after the condensation with the amine of the formula X—NH₂ to form the corresponding 1:2-benzoxazolone-5-sulfonic acid amide, it is only necessary to hydrolyze the oxazolone ring in order to obtain the compound of the formula 2.

As amines of the Formula 2 there may be mentioned: 2-amino-1-hydroxybenzene-4-sulfonic acid-N-1'-naphthylamide-4'-sulfonic acid amide, 2-amino-1-hydroxy-6-chlorobenzene-4-sulfonic acid phenylamide-3'-sulfonic acid amide, 2-amino-1-hydroxy-6-nitrobenzene-4-sulfonic acid-phenylamide-4'-sulfonic acid amide, 2-amino-1-hydroxy-4-nitro- or -4-chlorobenzene-6-sulfonic acid phenylamide-3'-sulfonic acid amide, 2-amino-1-hydroxybenzene-4- or -5-sulfonic acid - phenylamide - 3' - sulfonic acid-methylamide, 2-amino-1-hydroxybenzene-4- or -5-sulfonic acid-phenylamide - 3' - sulfonic acid - hydroxyethylamide, 2-amino-1-hydroxybenzene-4- or -5-sulfonic acid-phenylamide-4'-sulfonic acid-isopropyl- or -n-butylamide, 2-amino-1-hydroxy-4-chlorobenzene-5-sulfonic acid phenylamide-3'-sulfonic acid amide and especially 2-amino-1-hydroxybenzene-4- or -5-sulfonic acid phenylamide-2'-, -3'- or -4'-sulfonic acid amide.

There come into consideration as coupling components for preparing the monoazo-dyestuffs serving as starting materials in the present process keto-methylene compounds which are free from sulfonic acid and carboxylic acid groups and are capable of coupling in a position vicinal to the keto group. As compounds of this kind there are to be understood, for example, those which contain the keto-methylene group responsible for coupling in an open chain or advantageously those which contain the keto-methylene group in a heterocyclic ring, and above all a pyrazolone ring.

As compounds of this kind there may be mentioned: Acylacetic acid esters or amides, such as acetoacetic acid amide, acetoacetic acid methylamide, n-butylamide or phenylamide, acetoacetic acid dimethylamide, acetoacetic acid 2'- or 3'- or 4'-chlorophenylamide, benzoylacetic acid amide, benzoylacetic acid phenylamide, and also barbituric acid and 2:4-dihydroxy-quinoline. However, especially valuable starting materials are pyrazolones, such as 3-methyl- or 3-phenyl-5-pyrazolone, 1-n-butyl-3-methyl-5-pyrazolone, 1-phenyl-3-methyl-5-pyrazolone, 1-(2'- or 3'- or 4'-chlorophenyl)-3-methyl-5-pyrazolone, 5-pyrazolone-3-carboxylic acid amide, 5-pyrazolone-3-carboxylic acid -methyl, -ethyl-, isopropyl- or -n-butylamide, 5-pyrazolone-3-carboxylic acid-2'-, -3'- or -4'-chlorophenylamide, 5-pyrazolone-3-carboxylic acid- phenyl- or -3'-methyl-phenyl-amide, 1-phenyl-5-pyrazolone-3-carboxylic acid amide, 1-phenyl-5-pyrazolone-3-carboxylic acid-2'-, -3'- or -4'-chlorophenylamide, 1-phenyl-5-pyrazolone-3-carboxylic acid methyl-, -isopropyl- or -phenylamide.

The amines of the Formula 1 can be diazotized in the usual manner, for example, with the use of sodium nitrite and hydrochloric acid. The coupling of the resulting diazo-compounds with the aforesaid coupling components can also be carried out in the usual manner.

After the coupling reaction is finished the dyestuffs can easily be separated from the coupling mixture by filtration, as they are generally only slightly soluble in water. In fact in the form of their alkali compounds they are still soluble in water to such an extent that they can be used for dyeing from dyebaths requiring no addition of acid, and are therefore especially suitable for dyeing by the single bath chroming process, although in some cases they give good results in dyeing by the after-chroming process.

In the present process there may be obtained chromium compounds that contain 1 atom of chromium bound in complex union with one or two molecules of monoazo-dyestuff. In order to obtain the easily prepared and valuable 1:2-type of chromium compounds it is generally desirable to carry out the treatment with the agent yielding chromium by using a quantity of an agent yielding chromium corresponding to about one atomic proportion of chromium for every two molecular proportions of a dyestuff of the general Formula 1 or for every one molecular proportion of each of two different dyestuffs, at least one of which corresponds to the general Formula 1; and/or by carrying out the chroming treatment in a weakly acid to alkaline medium. Consequently, there are especially suitable for carrying out the process chromium compounds that are stable in alkaline media such, for example, as chromium compounds of aliphatic or aromatic ortho-hydroxy-carboxylic acids which contain chromium in complex union. As examples of aliphatic hydroxy-carboxylic acids there may be mentioned, inter alia, lactic acid, glycollic acid, citric acid and especially tartaric acid; among the aromatic ortho-hydroxycarboxylic acids there may be mentioned those of the benzene series such as 4-, 5- or 6-methyl-1-hydroxybenzene-2-carboxylic acid and above all 1- hydroxybenzene-2-carboxylic acid itself. The conversion of the dyestuffs into the complex chromium compounds is carried out with advantage with the application of heat, under atmospheric or superatmospheric pressure, for example, at the boiling temperature of the reaction mixture, if desired, in the presence of suitable additions, for example, salts of organic acids, bases, organic solvents or other agents assisting the formation of complexes.

The above described chroming treatment may be applied, for example, to a single dyestuff of the Formula 1. It is also possible, and is in many cases of advantage, for example, for producing various tints, to subject to the chroming treatment in a corresponding manner a mixture of two different dyestuffs of the Formula 1, or a mixture of one dyestuff of that formula and another ortho:ortho'-dihydroxymonoazo-dyestuff free from sulfonic acid and carboxylic acid groups.

The chromium compounds so obtained contain two molecules of monoazo-dyestuff bound in complex union to one atom of chromium, and at least one of the monoazo-dyestuff molecules must correspond to the general Formula 1. Especially valuable are chromium compounds of this kind, which contain two molecules of the same dyestuff of the Formula 1.

The new chromium compounds are soluble in water and in weakly acid media, and are indeed more soluble than the initial dyestuffs used for making them. They are suitable for dyeing a very wide variety of substances, such as plastic masses, resins, lacquers and the like, but especially for dyeing or printing animal materials such as silk, leather and especially wool, and also synthetic materials composed of superpolyamides or superpolyurethanes. They are suitable above all for dyeing from weakly alkaline, neutral or weakly acid, for example, acetic acid, baths. The dyeings so produced are distinguished by their good level character, good properties of wet fastness and very good fastness to light.

The following examples illustrate the invention, the parts and percentages being by weight:

*Example 1*

34.3 parts of 2-amino-1-hydroxybenzene-4-sulfonic acid anilide-3'-sulfonic acid amide are dissolved in 200 parts of 1 N-hydrochloric acid at 40° C. The mixture is cooled to 0° C. by the addition of ice and diazotization is brought about at 0–10° C. with 25 parts of a 4 N-solution of sodium nitrate. The resulting yellow diazo-suspension is neutralized with sodium carbonate, and then coupled with a solution, cooled to about 5° C., of 17.8 parts of 1-phenyl-3-methyl-5-pyrazolone in 100 parts of water, 4.2 parts of sodium hydroxide and 5 parts of sodium carbonate. When the coupling is finished the precipitated dyestuff is filtered off, washed with sodium chloride solution of 2 percent strength and dried.

5.28 parts of the dyestuff so obtained are dissolved in 150 parts of water and 5 parts by volume of a 2 N-solution of sodium hydroxide at the boiling temperature, then mixed with 15 parts of a solution of sodium chromosalicylate containing 2.6 percent of chromium, and the mixture is boiled for about 3 hours under reflux. The chomium compound is precipitated by neutralizing the chroming mixture with dilute acetic acid and salting out. The filtered off and dried dyestuff dissolves in hot water and in dilute sodium carbonate solution with an orange coloration, and dyes wool from a neutral or weakly acid bath orange tints which are fast to light.

In the following table are given the properties of further chromium complexes obtainable in an analogous manner. In column III is given the tint of the dyeing obtainable on wool or fibers of a superpolyamide with the chromium complex of the dyestuff obtained from the components given in columns I and II.

| | I Diazo-Component | II Coupling Component | III |
|---|---|---|---|
| 1 | OH, NH₂, SO₂NH—⟨⟩—SO₂NH₂ (on benzene) | CH₃—CO—CH₂—CO—HN—⟨⟩ | reddish yellow. |
| 2 | OH, NH₂, SO₂NH—⟨⟩—SO₂NH₂ (on benzene) | CH₃—CO—CH₂—CO—HN—⟨⟩—Cl | Do. |

| | I<br>Diazo-Component | II<br>Coupling Component | III |
|---|---|---|---|
| 3 | 2-amino-1-hydroxy-4-(3'-sulfamyl-phenylsulfamyl)-benzene | 1-(4'-chlorophenyl)-3-methyl-pyrazolone-(5) | orange. |
| 4 | 2-amino-1-hydroxy-4-(3'-sulfamyl-phenylsulfamyl)-benzene | 1-n-butyl-carbamyl-3-methyl-pyrazolone-(5) | red. |
| 5 | 2-amino-1-hydroxy-4-(3'-sulfamyl-phenylsulfamyl)-benzene | 1-(4'-chlorophenyl)-carbamyl-3-methyl-pyrazolone-(5) | Do. |
| 6 | 2-amino-1-hydroxy-4-(3'-sulfamyl-phenylsulfinyl)-benzene | 1-phenyl-carbamyl-3-methyl-pyrazolone-(5) | bluish red. |
| 7 | 2-amino-1-hydroxy-4-(3'-sulfamyl-phenylsulfamyl)-benzene | barbituric acid | yellow. |
| 8 | 2-amino-1-hydroxy-4-(3'-sulfamyl-phenylsulfamyl)-benzene | 2:4-dihydroxy-quinoline | bluish red. |
| 9 | 2-amino-1-hydroxy-4-(2'-sulfamyl-phenylsulfamyl)-benzene | 1-(4'-chlorophenyl)-3-methyl-pyrazolone-(5) | orange. |

| | I<br>Diazo-Component | II<br>Coupling Component | III |
|---|---|---|---|
| 10 | 2-amino-1-hydroxybenzene-4-sulfonic acid phenylamide-3'-sulfonic acid amide | 1-(4'-chlorophenyl)-3-methyl-5-pyrazolone | Do. |
| 11 | 2-amino-1-hydroxybenzene-5-sulfonic acid phenylamide-3'-sulfonic acid amide | 1-(4'-chlorophenyl)-3-methyl-5-pyrazolone | Do. |
| 12 | 2-amino-1-hydroxybenzene-4-sulfonic acid phenylamide-3'-sulfonic acid methylamide | 1-phenyl-3-methyl-5-pyrazolone | Do. |
| 13 | 2-amino-1-hydroxybenzene-4-sulfonic acid phenylamide-3'-sulfonic acid β-hydroxyethylamide | 1-phenyl-3-methyl-5-pyrazolone | Do. |

The 2-amino-1-hydroxybenzene-4-sulfonic acid-phenylamide-3'-sulfonic acid amide used as diazo component in this example can be made by reacting 1-chloro-2-nitrobenzene-4-sulfonic acid chloride with 1-aminobenzene-3-sulfonic acid amide, exchanging the chlorine atom in the resulting 1-chloro-2-nitrobenzene-4-sulfonic acid-phenylamide-3'-sulfonic acid amide for a hydroxyl group by means of an alkali or alkaline earth metal hydroxide, and finally reducing the nitro group in known manner to an amino group.

The 2-amino-1-hydroxybenzene-5-sulfonic acid-phenylamide-3'-sulfonic acid amide can be made by reacting 1:2-benzoxazolone-5-sulfonic acid chloride with 1-aminobenzene-3-sulfonic acid amide, and splitting up the oxazolone ring in the resulting 1:2-benzoxazolone-5-sulfonic acid-phenylamide-3'-sulfonic acid amide, for example, by means of an alkali hydroxide.

*Example 2*

5.28 parts of the dyestuff obtained as described in the first paragraph of Example 1 and 5.91 parts of the dyestuff obtained from diazotized 2-amino-1-hydroxybenzene-4-sulfonic acid phenylamide-3'-sulfonic acid amide and 5-pyrazolone-3-carboxylic acid para-chloro-phenylamide are dissolved in 240 parts of water and 10 parts by volume of a 2 N-solution of sodium hydroxide at the boiling temperature, 30 parts of a solution of sodium chromosalicylate containing 2.6 percent of chromium are then added, and the mixture is boiled under reflux for about 3 hours. By neutralizing the chroming mixture with dilute acetic acid and salting out the chromium compound is precipitated. The filtered off and dried mixed chromium complex dyes wool from a neutral to weakly acid bath red tints which are fast to washing.

*Example 3*

2 parts of the chromiferous dyestuff obtainable as described in Example 1 are dissolved in 4000 parts of water, 10 parts of crystalline sodium sulfate are added, and 100 parts of well wetted wool are entered at 40–50° C. into the dyebath so prepared. There are then added 2 parts of acetic acid of 40 percent strength, the temperature is raised to the boil in the course of ½ hour and dyeing is carried on at the boil for ¾ hour. The wool is finally rinsed in cold water and dried. The wool is dyed an orange tint which is fast to washing and has a good fastness to light.

The same dyeing is obtained by dyeing from a neutral bath, that is to say, without the addition of acetic acid to the bath.

What is claimed is:

1. A complex chromium compound containing one atom of chromium bound in complex union with substantially two monoazo dyestuff molecules free from sulfonic acid and carboxylic acid groups and of which at least one corresponds to the formula $$\begin{array}{c} OH \\ | \\ R_1-N=N-R_2 \\ | \\ SO_2-NH-R_3-SO_2-NH-C_nH_{2n-1} \end{array}$$

wherein $R_1$ represents a benzene radical bound to the azo linkage in ortho-position relatively to the hydroxyl group, $R_2$ represents the radical of a keto methylene compound bound to the azo linkage in vicinal position to the keto group, $R_3$ represents a benzene radical and $n$ a whole number up to 3.

2. A complex chromium compound containing one atom of chromium in complex union with substantially two molecules of monoazo-dyestuffs free from sulfonic acid and carboxylic acid groups and corresponding to the formula

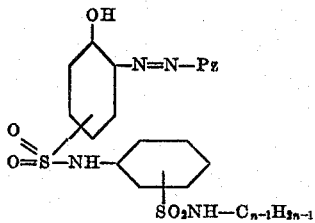

wherein Pz represents a 5-pyrazolone radical bound to the azo linkage in 4-position and $n$ represents a whole number up to 3.

3. A complex chromium compound containing one atom of chromium in complex union with substantially two molecules of monoazo-dyestuffs free from sulfonic acid and carboxylic acid groups and corresponding to the formula

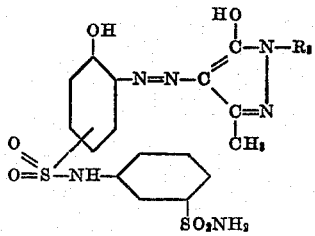

wherein $R_3$ represents a benzene radical.

4. The complex chromium compound containing one atom of chromium in complex union with substantially two monoazo dyestuff molecules both of which correspond to the formula

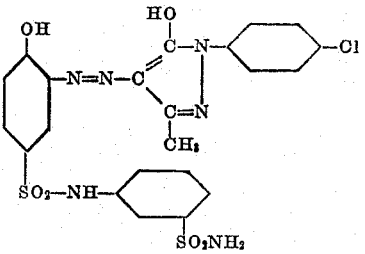

5. The complex chromium compound containing one atom of chromium in complex union with substantially two monoazo dyestuff molecules both of which correspond to the formula

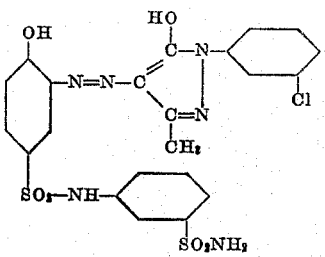

References Cited in the file of this patent
UNITED STATES PATENTS

| | | |
|---|---|---|
| 2,495,244 | Felix et al. | Jan. 24, 1950 |
| 2,572,394 | Ruckstuhl et al. | Oct. 23, 1951 |
| 2,597,676 | Schetty | May 20, 1952 |
| 2,634,263 | Steinemann | Apr. 7, 1953 |